United States Patent
Hisshion et al.

(10) Patent No.: US 8,268,285 B2
(45) Date of Patent: Sep. 18, 2012

(54) PROCESS FOR THE RECOVERY OF TELLURIUM FROM MINERALS AND/OR ACIDIC SOLUTIONS

(75) Inventors: Robert John Hisshion, Olongapo (PH); Crispinne C. Patiño, Laguna (PH)

(73) Assignee: Pacific Rare Specialty Metals and Chemicals, Inc., Rosario Cavite (PH)

( * ) Notice: Subject to any disclaimer, the term of this patent is extended or adjusted under 35 U.S.C. 154(b) by 637 days.

(21) Appl. No.: 12/494,153

(22) Filed: Jun. 29, 2009

(65) Prior Publication Data

US 2010/0326840 A1    Dec. 30, 2010

(51) Int. Cl.
C01B 19/00 (2006.01)
(52) U.S. Cl. ......... 423/508; 423/509; 423/510; 205/560
(58) Field of Classification Search .......... 423/508–510; 205/560
See application file for complete search history.

(56) References Cited

U.S. PATENT DOCUMENTS

| | | | |
|---|---|---|---|
| 2,039,256 A | 4/1936 | Martin et al. | |
| 2,076,738 A | 4/1937 | Martin et al. | |
| 2,835,558 A | 5/1958 | Vaaler | |
| 2,990,248 A * | 6/1961 | Vaaler | 423/509 |
| 3,127,244 A | 3/1964 | Elkin et al. | |
| 3,560,154 A * | 2/1971 | Jueschke et al. | 423/184 |
| 4,002,544 A | 1/1977 | Heimala et al. | |
| 4,106,939 A | 8/1978 | Chang et al. | |
| 4,163,046 A | 7/1979 | Subramanian et al. | |
| 4,229,270 A * | 10/1980 | Subramanian et al. | 205/569 |
| 4,293,332 A | 10/1981 | Wang et al. | |
| 4,299,810 A | 11/1981 | Snow | |
| 4,374,758 A | 2/1983 | Sasaki et al. | |
| 4,615,731 A | 10/1986 | Thomas et al. | |
| 4,666,514 A | 5/1987 | Bertha | |
| 4,698,184 A | 10/1987 | Yu et al. | |
| 4,725,357 A | 2/1988 | Downing et al. | |
| 4,770,700 A | 9/1988 | Bertha et al. | |
| 5,147,572 A | 9/1992 | Bush | |
| 5,271,909 A | 12/1993 | Claessens et al. | |
| 5,286,463 A | 2/1994 | Schwartz, Jr. | |
| 5,939,042 A | 8/1999 | Stafiej et al. | |
| 6,090,290 A | 7/2000 | Goodman et al. | |
| 6,183,644 B1 | 2/2001 | Adams et al. | |
| 2005/0255017 A1 | 11/2005 | Okada et al. | |
| 2009/0191107 A1 | 7/2009 | Meyer et al. | |
| 2010/0329968 A1 | 12/2010 | Hisshion et al. | |

(Continued)

FOREIGN PATENT DOCUMENTS

CN    1669913 A    9/2005

(Continued)

OTHER PUBLICATIONS

International Application No. PCT/IB2010/001549—PCT International Search Report and PCT Written Opinion of the International Searching Authority dated Mar. 14, 2011.

(Continued)

*Primary Examiner* — Nicholas A. Smith
(74) *Attorney, Agent, or Firm* — Miles & Stockbridge P.C.; David R. Schaffer, Esq.

(57) ABSTRACT

A process and method for recovering elemental tellurium from minerals and acidic solutions using a reducing sugar as the reducing agent in order to reduce and precipitate tellurium as tellurium dioxide ($TeO_2$) from which elemental tellurium may be recovered.

41 Claims, 3 Drawing Sheets

U.S. PATENT DOCUMENTS

2010/0329969 A1 12/2010 Hisshion et al.

FOREIGN PATENT DOCUMENTS

| CN | 1923674 A | | 3/2007 |
| CN | 101417790 A | | 4/2009 |
| IN | 200200055 I1 | * | 11/2007 |
| JP | 61053103 A | * | 3/1986 |
| RU | 2002840 C1 | * | 11/1993 |
| SU | 979516 A1 | | 12/1982 |

OTHER PUBLICATIONS

International Application No. PCT/ IB2010/001548—PCT International Search Report and PCT Written Opinion of the International Searching Authority dated Apr. 27, 2011.

Emelina et al., "Redox interaction of selenium(VI) with glucose," Trudy Khimiko-Metallurgicheskogo Instituta, Akademiya Nauk Kazakhskoi SSR, 28, 45-9 Coden: TKMAZ; ISSN: 0516-0324, 1978, XP8129178 the whole document & Database CA [Online] Chemical Abstracts Service, Columbus, Ohio, US; Emelina, A.V., et al., "Redox interaction of selenium(VI) with glucose" retrieved from STN Database accession No. 90:170893 abstract.

Chen et al., "Selenium nanotube synthesized via a facile template-free hydrothermal method," Chemical Physics Letters, North-Holland, Amsterdam, NL, vol. 417, No. 1-3, Jan. 9, 2006, pp. 132-136, XP025012922, ISSN: 0009-2614 DOI: DOI: 10.1016/J. CPLETT. 2005.09.083 [retrieved on Jan. 9, 2006].

Lenher, V., "Preparation of metallic tellurium", Journal of the American Chemical Society, Apr. 1899, pp. 347-351, vol. 21, No. 4, XP002610563, DOI: 10.1021/ja02054a002.

Victor Lenher, J. Livingston R. Morgan, "The Specific Gravity and Electrical Resistance of Metallic Tellurium", J. Am. Chem. Soc., 1900, 22 (1), 28-31 DOI 10.1021/ja02039a008, publication date (web): May 1, 2002.

\* cited by examiner

PROCESS FOR THE RECOVERY OF TELLURIUM FROM MINERALS AND/OR ACIDIC SOLUTIONS

FIELD OF THE INVENTION

The present invention relates to a process and method for separating and recovering precious metals from copper refinery anode slimes in general, and in particular to a process and method for recovering tellurium from minerals and acidic solutions.

BRIEF DESCRIPTION OF THE DRAWINGS

The foregoing and other aspects, features, and advantages of the present invention will be better appreciated from the following description of the embodiments, considered with reference to the accompanying drawings, wherein.

DETAILED DESCRIPTION OF THE PREFERRED EMBODIMENTS

Copper refinery anode slimes, which are settled and accumulated at the bottom of the electrolytic copper refining cells, are made up of components of the anodes which are not soluble in the electrolyte. These components contain various amounts of copper, silver, gold, sulfur (sulphur), lead, arsenic, selenium, tellurium, nickel, silica, and other components. Copper present in the slimes occurs usually in the form of metallic copper sulphide, copper telluride or copper selenide. In the treatment of anode slimes, usually copper and nickel are removed first and selenium and tellurium thereafter, using different recovery processes.

Figure 1:
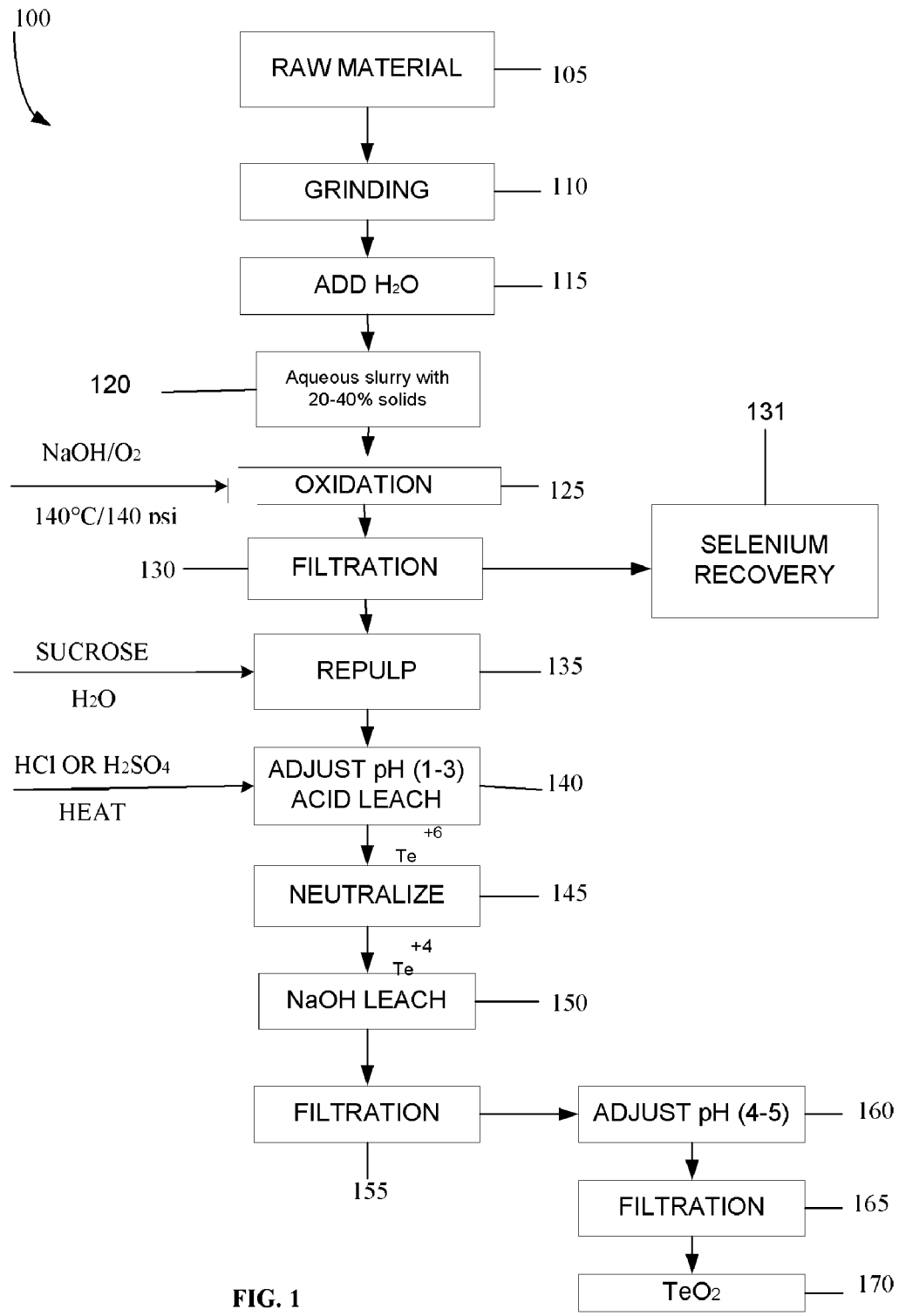
FIG. 1 is a drawing showing an outline of a process for separating selenium and tellurium from the material and from each other, and a process for precipitating tellurium dioxide.
Figure 2:
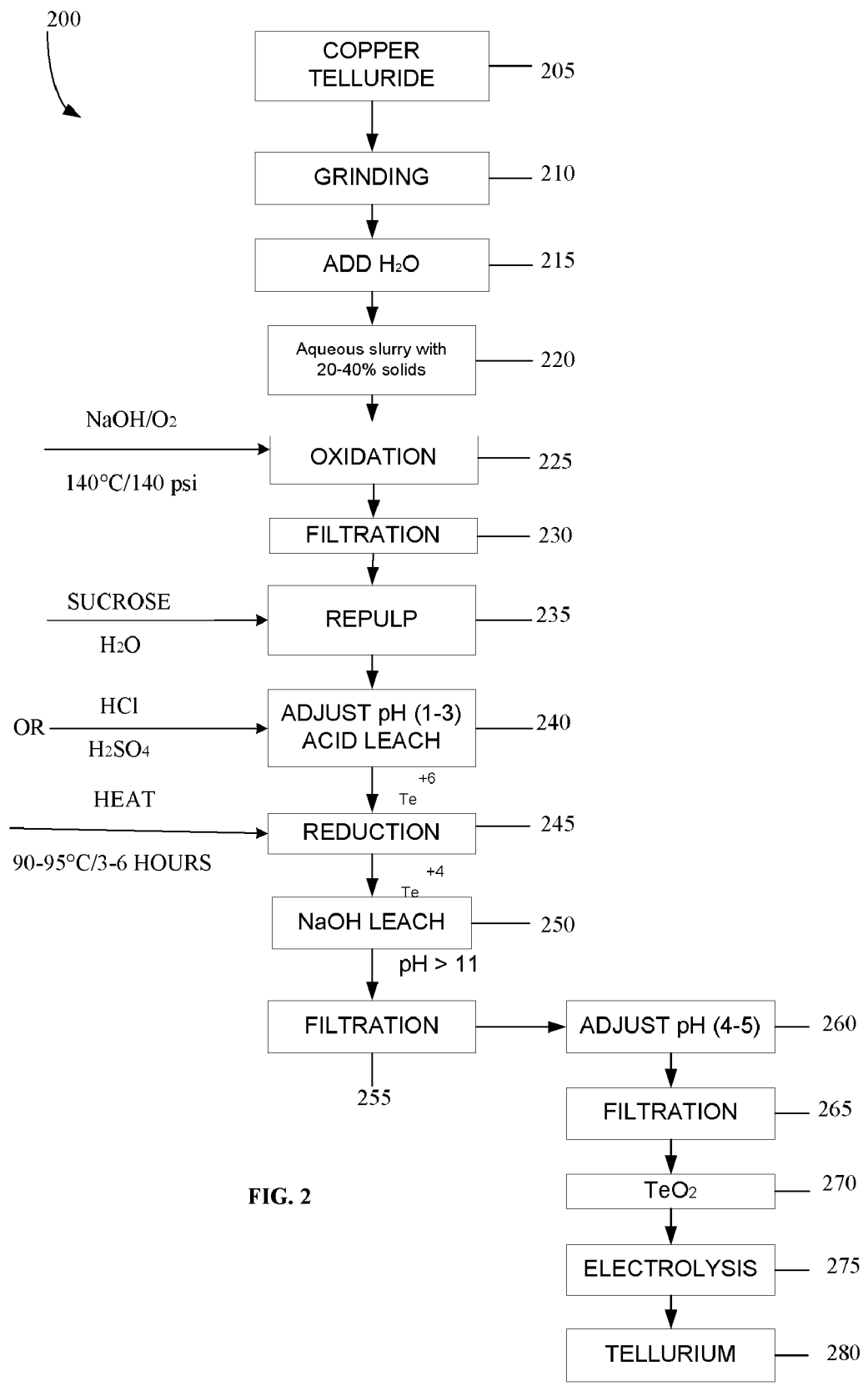
FIG. 2 is a drawing showing an outline of a process for recovering elemental tellurium from a material comprising copper telluride.

Whenever selenium and tellurium are present simultaneously in significant concentrations in the slime, it is important to provide a clean separation between these two elements before they are removed and recovered. It is also important to improve the recovery of these precious metals, to reduce the processing expense, and to use a process that is environmentally friendly. In the embodiments of FIGS. 1 and 2, the process to recover tellurium from a mineral includes, in general, the steps of: (i) leaching, where the precious metals are introduced to an aqueous environment, (ii) extraction, where the metals are separated and purified, and (iii) reduction, where the metallic ions are reduced and precipitated from solutions. Reducing the metallic ions using reducing sugars or hydrolysis products of sugars, such as, sucrose, significantly reduces the overall processing expense.

Referring to FIG. 1 it is shown a hydrometallurgical process 100 for separating tellurium and selenium from a raw material feed 105 containing copper, tellurium, selenium, as well as other metals and impurities. The raw material feed 105 is first finely ground 110 and then mixed with an aqueous solution 115, such as water, to obtain slurry 120 containing about 20 to 40% solids. An alkali medium is added to the slurry and its concentration adjusted to about 50-250 g/L. The amount of the alkali medium required varies with the composition of the treated material and the particular application. The alkali medium can be any alkali metal hydroxide, such as sodium, potassium or lithium hydroxide.

In FIG. 1 sodium hydroxide (NaOH) is used as the alkali hydroxide. The alkali hydroxide added to the slurry dissolves certain materials from the solids present in the slurry (e.g., leaching). Selenium is soluble and will migrate into the alkali solution whereas tellurium remains in the solids, forming part of the undissolved leaching residue. The slurry is next heated 125 in a pressure vessel while oxygen ($O_2$) is injected into the vessel to facilitate oxidation of tellurium to tellurate. The oxygen can be provided, for example, by commercial oxygen, however, air may also be used as the oxidation agent. Typically, the temperature and pressure in the pressure vessel are maintained at around 140 degrees Celsius and 140 psi, until oxidation is complete. In the presence of copper, the alkali metal and oxygen, tellurium oxidizes to tellurate ($TeO_4^{2-}$, or $TeO_6^{6-}$).

The oxidized tellurium is insoluble and remains in the solids as part of the undissolved leaching residue, whereas selenium, which migrated into the alkali hydroxide solution, remains in the alkali solution. Separation of selenium from the oxidized tellurium requires a solid/liquid separating process 130. This can be done by filtration 130, for example. During filtration 130 the alkali hydroxide solution is separated from the undissolved leaching residue, and therefore a clean separation between selenium and tellurium can be obtained 131. Polytetrafluoroethylene filter cloths or any other filter material can be used to separate the undissolved components from the dissolved components. Once separated, elemental selenium and elemental tellurium may be recovered separately. For example, a novel selenium recovery process is disclosed in copending U.S. application Ser. No. 12/494,081, and filed concurrently herewith, the details of which are hereby incorporated herein by reference in its entirety. The recovery of the elemental tellurium is next described.

The undissolved solids are next repulped 135 in an aqueous solution, such as water, for example, to create an aqueous slurry including the undissolved solids. A reducing agent, such as a reducing sugar or a hydrolysis product of a sugar is added to the aqueous slurry to facilitate reduction of the tellurium. Any of the available reducing sugars, for example, sacharrides, or hydrolysis products of sugars, such as fructose, sucrose, polyhydroxy aldehydes and ketones can be used as reducing agents, with sucrose being used in the embodiment of FIG. 1. An acidic medium, such as a hydrochloric or a sulfuric medium, for example, is also added to the aqueous slurry 140 to adjust the pH of the slurry to a pH value of between 1 and 3, and for example, to a pH of 2, before the slurry is heated to a temperature of about 90-95 degrees Celsius for about 3 to 6 hours. Under these conditions, tellurium is effectively reduced 145 from $Te^{6+}$ to substantially $Te^{4+}$.

After reduction 145, the pH of the slurry is once again adjusted 150 to a pH value greater than 11, using an alkali metal hydroxide solution, for example a sodium hydroxide solution. Under these conditions the reduced tellurium $Te^{4+}$ becomes soluble and effectively dissolves into the alkali hydroxide solution (NaOH leaching 150). To precipitate tellurium as tellurium dioxide ($TeO_2$), the alkali hydroxide solution containing the reduced tellurium is first separated by filtration 155, for example, from the slurry which is now part of the leaching residue, and then the pH of the filtrate including the alkali hydroxide solution with the reduced tellurium is adjusted 160 to an acidic value of between 4 and 5. The acidic solution is then filtered off 165 from the tellurium dioxide precipitate 170. Elemental tellurium can be recovered from the tellurium dioxide precipitate 170 through electrolysis, for example (not shown).

In the embodiment of FIG. 2, it is shown a hydrometallurgical process 200 for recovering elemental tellurium from a raw material feed 205 including copper telluride. The raw material containing copper telluride is finely ground 210 and then mixed 215 with an aqueous solution, such as water, for example, to obtain a slurry 120 containing about 20 to 40% solids. An alkali medium is added to the slurry and its concentration adjusted to about 50-250 g/L. The amount of the alkali medium required varies with the composition of the treated material and the particular application. The alkali medium can be any alkali metal hydroxide, such as sodium, potassium or lithium hydroxide, for example.

Sodium hydroxide (NaOH) is used as the alkali hydroxide in the embodiment of FIG. 2. The alkali hydroxide added to the slurry dissolves certain materials from the solids present in the slurry (e.g., leaching). Tellurium remains in the solids, forming part of the undissolved leaching residue. The slurry is next heated in a pressure vessel while oxygen ($O_2$) is injected into the vessel to facilitate oxidation 225 of tellurium to tellurate. The oxygen can be provided, for example, by commercial oxygen, however, air may also be used as the oxidation agent. Typically, the temperature and pressure in the pressure vessel are maintained at around 140 degrees Celsius and 140 psi, until oxidation 225 is complete. In the presence of copper, the alkali metal and oxygen, tellurium oxidizes to tellurate ($TeO_4^{2-}$, or $TeO_6^{6-}$).

The oxidized tellurium is insoluble and remains in the solids as part of the undissolved leaching residue. Separation of the oxidized tellurium in the solids from the remaining solution requires a solid/liquid separating process 230. This can be done by filtration 230, for example. During filtration 230 the alkali hydroxide solution is separated from the undissolved leaching residue, and therefore a clean separation between tellurium and other substances present in the solution can be obtained 230. Polytetrafluoroethylene filter cloths or any other filter material can be used to separate the undissolved components from the dissolved components. The recovery of the elemental tellurium is next described.

The undissolved solids in the leaching residue are next repulped 235 in an aqueous solution, such as water, for example, to create an aqueous slurry including the undissolved solids. A reducing agent, such as a reducing sugar or a hydrolysis product of a sugar, is added to the aqueous slurry to facilitate reduction of the tellurium. Any of the available reducing sugars, for example, sacharrides, or hydrolysis products of sugars, such as fructose, sucrose, polyhydroxy aldehydes and ketones can be used as reducing agents, with sucrose being used in the embodiment of FIG. 2. An acidic medium, such as a hydrochloric or a sulfuric medium, for example, is also added to the aqueous slurry 240 to adjust the pH of the slurry to a pH value of between 1 and 3, and for example, to a pH of 2, before the slurry is heated to a temperature of about 90-95 degrees Celsius for about 3 to 6 hours. Under these conditions, tellurium is effectively reduced 245 from $Te^{6+}$ to substantially $Te^{4+}$.

After reduction 245, the pH of the slurry is once again adjusted 250 to a pH value greater than 11, using an alkali metal hydroxide solution, for example a sodium hydroxide solution. Under these conditions the reduced tellurium $Te^{4+}$ becomes soluble and effectively dissolves into the alkali hydroxide solution (NaOH leaching) 250. To precipitate tellurium as tellurium dioxide ($TeO_2$), the alkali hydroxide solution containing the reduced tellurium is first separated by filtration 255, for example, from the slurry which is now part of the leaching residue, and then the pH of the filtrate including the alkali hydroxide solution with the reduced tellurium is adjusted 260 to an acidic value of between 4 and 5. The acidic solution is then filtered off 265 from the tellurium dioxide precipitate 270. The precipitated tellurium dioxide 270 can be reduced electrolytically 275 to elemental tellurium (Te) 280, which can be further purified by electrolysis or distillation, for example.

Figure 3:
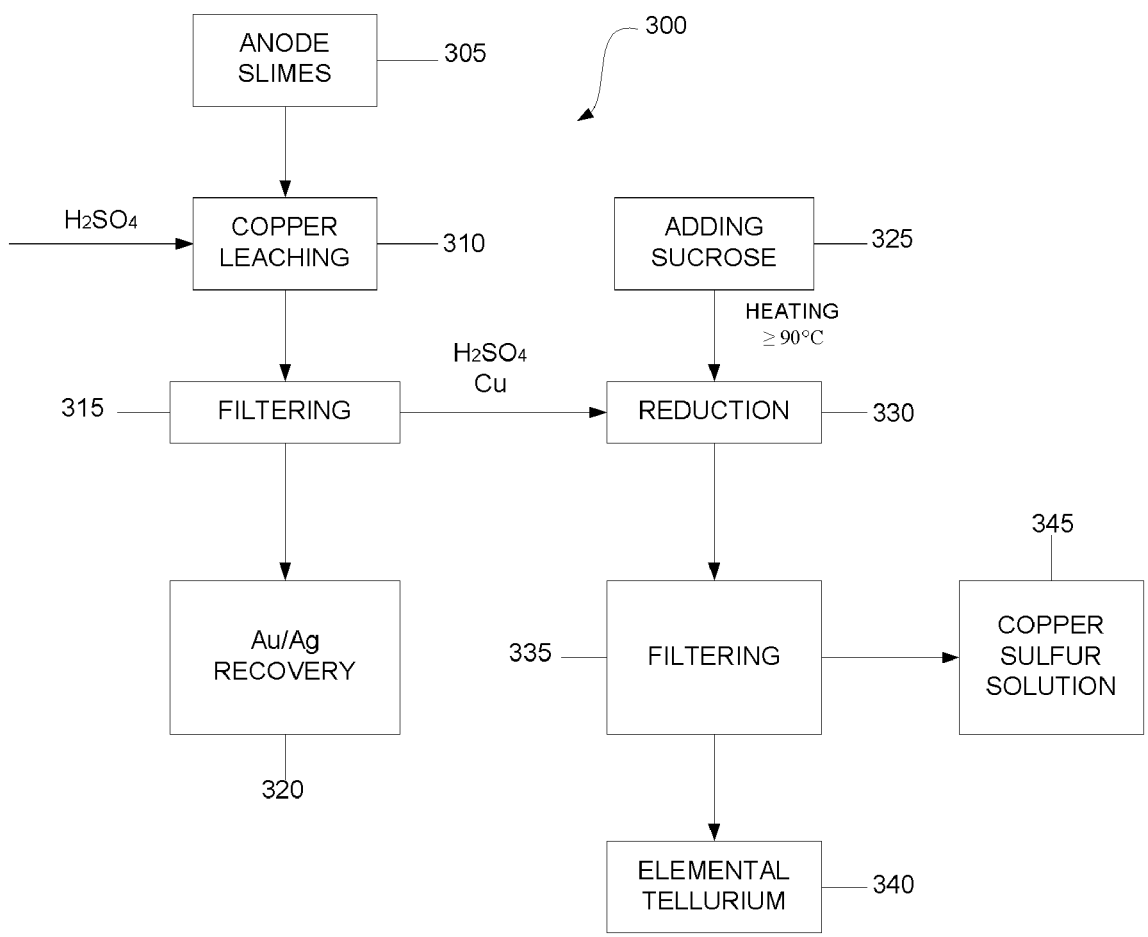
FIG. 3 is a drawing showing an outline of a process for recovering elemental tellurium from a decopperized anode slime solution.

In FIG. 3 is shown a treatment process 300 for recovering elemental tellurium 340 from decopperized anode slimes 305. Anode slimes contain different components of the anodes which are not soluble in the electrolyte, such as, various amounts of copper, silver, gold, sulphur, lead, arsenic, selenium, tellurium, nickel, silica, and other components. Copper present in the slimes occurs usually in the form of metallic copper sulphide, copper telluride or copper selenide. In the treatment of anode slimes, usually copper and nickel are removed first. The initial stage for processing copper refinery slimes 305 includes removal of copper from the anode slimes 305 by a copper leaching method 310. Copper is dissolved in a solution containing about 200-250 g/L sulfuric acid ($H_2SO_4$), for example. The leaching 310 is carried out at either a temperature of at least 90 degrees Celsius at atmospheric pressure or in an autoclave at elevated temperatures and elevated oxygen pressures. During this process a portion of the tellurium present in the solution may also dissolve. Tellurium dissolution is low when the leaching is carried out at atmospheric pressure and at around 90 degrees Celsius. However, tellurium dissolution is much more significant when the leaching is carried out in the autoclave. After filtering 315, selenium in the decopperized slimes is removed and the decopperized slimes are smelted for gold and/or silver recovery 320. By adding a strong acid, $H_2SO_4$, for example, in an amount of approximately 20-200 g/L to the copper leached solution still containing a certain amount of copper, the tellurium contained in the solution can be reduced 330 using a reducing agent 325, such as sucrose, upon heating the solution to a temperature of above 90 degrees Celsius. The amount of copper still present in the solution after the copper leaching can be above 25 g/L. After filtering 335 the solution, elemental tellurium is recovered 340 and the copper sulphur solution 345 can be recycled. The recycled copper sulphur solution can be sent to a separate copper recovery circuit or recycled to a copper tank house.

Disclosed embodiments include (i.e., comprise) a process and method for recovering elemental tellurium (Te) from a solution by first reducing tellurium from tellurium $Te^{6+}$ to substantially tellurium $Te^{4+}$. To facilitate reduction of the tellurium, a reducing agent is added to the solution before heating the solution to a predetermined temperature. The heating temperature of the solution is about 90 to 95 degrees Celsius. After reduction, the pH of the solution is adjusted to a value greater than 11 using an alkali medium, and leached to cause reduced tellurium to migrate into the alkali solution. After leaching, the pH of the alkali solution is adjusted again to a value ranging from 4 to 5 to precipitate tellurium dioxide ($TeO_2$). The elemental tellurium can be recovered from the tellurium dioxide through electrolysis. The reducing agent can be a reducing sugar or a hydrolysis product of a sugar and the alkali medium can be sodium hydroxide.

In another embodiment, the reducing agent is sucrose.

In another embodiment, before heating, the pH of the solution is adjusted to a value between 1 and 3 with an acid, such as hydrochloric or sulfuric acid.

Disclosed embodiments also include (i.e., comprise) a method for separating and recovering elemental tellurium (Te) and elemental selenium (Se) from a material. In this method the material is leached with a first alkali solution causing selenium to migrate into the first alkali solution. Tellurium is next oxidized by heating the alkali solution and a resulting leaching residue to a predetermined first temperature of about 140 degrees Celsius at a pressure of about 140 psi until oxidation is complete. The leaching residue which includes the oxidized tellurium is next separated from the first alkali solution that still contains the selenium. After repulping the leaching residue in an aqueous solution, a reducing agent, such as a reducing sugar, is added to the solution before the solution is heated to a second predetermined temperature of about 90-95 degrees Celsius, whereby the oxidized tellurium is reduced. After the tellurium is reduced, the aqueous solution is leached using a second alkali solution causing the reduced tellurium to migrate into the second alkali solution. The pH of the second alkali solution is next adjusted to a value ranging from 4 to 5 to facilitate precipitation of tellurium dioxide ($TeO_2$) in an acidic medium. Elemental tellurium can be recovered from the tellurium dioxide precipitate using an electrolysis method. Elemental selenium present in the first alkali solution can be likewise recovered from the alkali solution, although through a separate recovery process, which is the subject of copending U.S. Pat. application Ser. No. 12/494,081, filed concurrently herewith.

In an embodiment of the above method, the material includes copper telluride, and the first alkali solution is an alkali hydroxide having a concentration of between 50-250 g/L.

In another embodiment the alkali hydroxide is sodium hydroxide.

In another embodiment the reducing agent is a hydrolysis product of a sugar, such as for example, but not limited to, sucrose.

In yet another embodiment, in the reduction phase, the pH of the aqueous solution is adjusted using an acid medium, such as a hydrochloric or sulfuric medium, to a value of between 1 and 3.

Disclosed embodiments also include a method of reducing tellurium in a solution by adding a reducing agent to the solution, adjusting the pH of the solution to a value between 1 and 3 using an acid medium, followed by heating the acidic solution to a temperature of about 90-95 degrees Celsius for a predetermined time. The reducing agent is a reducing sugar or a hydrolysis product of a sugar, and the predetermined time is between 3 to 6 hours.

In a variation, the acidic medium is a hydrochloric acid medium.

In another variation the acidic medium is a sulfuric acid medium.

In another embodiment, a treatment method for the decopperized solution is disclosed. In this method, the initial removal of copper from the anode slimes can be accomplished by dissolving copper in a sulfuric acid solution, for example. The decopperized slimes are then deselenized (i.e., removal of selenium) and smelted for gold (Au) and silver (Ag) recovery. During the removal of copper from the anode slimes, a portion of the tellurium (Te) present in the slimes may also dissolve.

In a variation, the decopperized solution can be reduced by adding a reducing agent, such as sucrose, for example, to the solution to recover elemental tellurium.

In a variation, the copper leaching is carried out at a predetermined temperature of about 90 degrees Celsius at atmospheric pressure.

In another variation, the copper leaching is carried out in an autoclave at elevated temperature and elevated oxygen pressure.

In yet another variation, the heating temperature for the elemental tellurium reduction can be about 90 degrees Celsius.

In another variation, in a strong acid solution of about 20-200 g/L $H_2SO_4$ containing copper (Cu), for example, the reducing sugar reduces contained tellurium to elemental tellurium on heating.

In yet another variation, the copper sulphur solution obtained after filtering and recovery of tellurium can be recycled.

It should be understood that the present invention is not limited to the embodiments described therein. Rather, those skilled in the art will appreciate that various changes and modification can be made in keeping with the principles exemplified by the illustrative embodiments.

What is claimed is:

1. A process for recovering elemental tellurium (Te) from a solution, comprising:
   reducing tellurium in the solution from $Te^{6+}$ to being substantially $Te^{4+}$ using a reducing agent before acid leaching the solution and before heating the acid leached solution to a predetermined temperature for a predetermined time, wherein the reducing agent is a reducing sugar or a hydrolysis product of a sugar;
   adjusting a pH of the acid leached solution to a pH value greater than 11 after the tellurium is reduced by leaching the acid leached solution with an alkali solution causing the reduced tellurium ($Te^{4+}$) to migrate into the alkali solution;
   obtaining an alkali solution filtrate by filtering off the alkali solution;
   adjusting the pH of the alkali solution filtrate to a pH value ranging from 4 to 5 to precipitate tellurium dioxide ($TeO_2$) in an acidic solution;
   obtaining the tellurium dioxide ($TeO_2$) precipitate by filtering off the acidic solution; and
   recovering elemental tellurium from the tellurium dioxide ($TeO_2$) precipitate.

2. The process as claimed in claim 1, wherein the reducing agent is a reducing sugar.

3. The process as claimed in claim 1, wherein the reducing agent is a hydrolysis product of sugar.

4. The process as claimed in claim 3, wherein the hydrolysis product is sucrose.

5. The process as claimed in claim 1, wherein the acid leaching is done using a hydrochloric or sulfuric acid.

6. The process as claimed in claim 1, wherein the reducing further comprises adjusting the pH of the solution using an acid medium to a pH value between 1 and 3 before the heating of the acid leached solution.

7. The process as claimed in claim 6 wherein the acid medium is hydrochloric or sulfuric acid.

8. The process as claimed in claim 1, wherein the alkali solution is an alkali hydroxide solution.

9. The process as claimed in claim 8, wherein the alkali hydroxide solution is a sodium hydroxide solution.

10. The process as claimed in claim 1, wherein recovering elemental tellurium from the tellurium dioxide precipitate is by an electrolytic method.

11. The process as claimed in claim 1, wherein the predetermined temperature is about 90-95 degrees Celsius and the predetermined time is substantially between 3 and 6 hours.

12. A method for separating elemental tellurium (Te) and selenium (Se) from a material including tellurium and selenium, the method comprising:

leaching the material with a first alkali solution causing the selenium to migrate into the first alkali solution, while the tellurium remains in a leaching residue;

oxidizing the tellurium in the leaching residue;

separating the leaching residue with the oxidized tellurium from the first alkali solution;

reducing tellurium by heating an aqueous solution including the leaching residue and a reducing agent to a predetermined temperature for a predetermined time, wherein the reducing agent is a reducing sugar or a hydrolysis product of a sugar;

leaching the reduced aqueous solution using a second alkali solution causing the reduced tellurium to migrate into the second alkali solution;

adjusting the pH of the second alkali solution to a pH value ranging from 4 to 5 to precipitate tellurium dioxide ($TeO_2$); and recovering elemental tellurium from the tellurium dioxide ($TeO_2$) precipitate.

13. The method as claimed in claim 12, wherein the material is an aqueous medium containing 20-40% finely ground copper telluride.

14. The method as claimed in claim 12, wherein the first alkali solution is an alkali hydroxide solution having a concentration of between 50-250 g/L.

15. The method as claimed in claim 14, wherein the first alkali hydroxide solution is a sodium hydroxide solution.

16. The method as claimed in claim 12, wherein the oxidizing is done by heating a charge including the leaching residue and the first alkali solution to about 140 degrees Celsius at a pressure of about 140 psi, while adding oxygen.

17. The method as claimed in claim 12, wherein the predetermined temperature is between 90-95 degrees Celsius and the predetermined time is between 3 and 6 hours.

18. The method as claimed in claim 12, wherein the separating is by filtration.

19. The method as claimed in claim 12, wherein the reducing agent is a reducing sugar.

20. The method as claimed in claim 12, wherein the reducing agent is a hydrolysis product of a sugar.

21. The method as claimed in claim 20, wherein the hydrolysis product is sucrose.

22. The method as claimed in claim 12, wherein the reducing further comprises adjusting the pH of the material using an acid medium to a pH value between 1 and 3 before heating.

23. The method as claimed in claim 22 wherein the acid medium is a hydrochloric or sulfuric acid solution.

24. The method as claimed in claim 12, wherein the second alkali solution is an alkali hydroxide solution.

25. The method as claimed in claim 24, wherein the alkali hydroxide solution is a sodium hydroxide solution.

26. The method as claimed in claim 12, wherein the recovering of the elemental tellurium from the tellurium dioxide is by electrolysis.

27. A method of recovering elemental tellurium (Te) from a decopperized anode slime solution, comprising:

obtaining a solution containing tellurium by separating the solution from decopperized slime in the decopperized anode slime solution;

adding an acid medium to the solution in a concentration of approximately 20-200 g/L;

reducing the tellurium in the solution to its elemental state (Te) by:

adding a reducing agent to the solution, wherein the reducing agent is a reducing sugar or a hydrolysis product of a sugar; and heating the solution to a temperature greater than 90 degrees Celsius for a predetermined time and recovering the elemental tellurium (Te) by filtering the elemental tellurium (Te) directly from the solution.

28. The method as claimed in claim 27, wherein the acid medium is a hydrochloric or sulfuric medium.

29. The method as claimed in claim 27, wherein the reducing agent is a hydrolysis product of a sugar.

30. The method as claimed in claim 29, wherein the hydrolysis product is sucrose.

31. The method as claimed in claim 27, wherein the predetermined time is between 3 and 6 hours.

32. The method as claimed in claim 27, wherein the reducing agent is a reducing sugar.

33. A process for recovering elemental tellurium from an aqueous solution comprising about 20-40% finely ground copper telluride solids and a first alkali hydroxide solution having a concentration of about 50-250 g/L, the process comprising:

oxidizing the tellurium by heating the aqueous solution to a temperature of about 140 degrees Celsius at a pressure of about 140 psi while injecting oxygen into the aqueous solution;

separating the oxidized tellurium from the aqueous solution;

repulping the oxidized tellurium after the separation to obtain a slurry including the oxidized tellurium;

reducing the tellurium in the slurry by:

adding a reducing sugar to the slurry;

adjusting a pH of the slurry to a pH value of between 1-3 using an acid medium after adding the reducing sugar; and heating the slurry to a temperature of about 90-95 degrees Celsius for about 3-6 hours;

adjusting the pH of the slurry including the reduced tellurium to a pH value greater than 11;

leaching the slurry after the pH adjustment with a second alkali hydroxide solution so as to migrate reduced tellurium into the second alkali hydroxide solution;

separating the second alkali hydroxide solution containing the reduced tellurium from a leaching residue containing the rest of the slurry;

adjusting a pH of the separated second alkali hydroxide solution containing the reduced tellurium to a pH value of between 4-5 to facilitate precipitation of tellurium oxide ($TeO_2$) in an acidic medium;

separating the tellurium oxide precipitate from the acidic medium; and recovering elemental tellurium from the tellurium oxide precipitate.

34. The process as claimed in claim 33, wherein the first and second alkali hydroxide solutions are sodium hydroxide solutions.

35. The process as claimed in claim 33, wherein the repulping is done by adding water to the oxidized tellurium.

36. The process as claimed in claim 33, wherein the reducing sugar is sucrose.

37. The process as claimed in claim 33, wherein the acid medium is a hydrochloric or a sulphuric acid solution.

38. The process as claimed in claim 33, wherein the separating of oxidized tellurium from the aqueous solution is by filtration.

39. The process as claimed in claim 33, wherein the separating of the second alkali hydroxide solution containing the reduced tellurium from the leaching residue containing the rest of the slurry is by filtration.

40. The process as claimed in claim 33, wherein the separating of the tellurium oxide precipitate from the acidic medium is by filtration.

41. The process as claimed in claim 33, wherein the recovery of the elemental tellurium from the tellurium oxide precipitate is by electrolysis.

* * * * *